(12) United States Patent
Waleski

(10) Patent No.: US 11,186,509 B2
(45) Date of Patent: Nov. 30, 2021

(54) MARINE WATER TREATMENT SYSTEM BUILT INTO DOCK BOX FOR HIGH-PRESSURE BOAT WASH AND ONBOARD WATER SUPPLY

(71) Applicant: Michael Scott Waleski, Frankfort, IL (US)

(72) Inventor: Michael Scott Waleski, Frankfort, IL (US)

( * ) Notice: Subject to any disclaimer, the term of this patent is extended or adjusted under 35 U.S.C. 154(b) by 234 days.

(21) Appl. No.: 16/384,105

(22) Filed: Apr. 15, 2019

(65) Prior Publication Data

US 2020/0325052 A1    Oct. 15, 2020

(51) Int. Cl.
    *C02F 5/00*     (2006.01)
    *B63J 4/00*     (2006.01)
    *C02F 103/00*   (2006.01)

(52) U.S. Cl.
    CPC ............... *C02F 5/00* (2013.01); *B63J 4/00* (2013.01); *C02F 2103/008* (2013.01); *C02F 2201/001* (2013.01); *C02F 2201/005* (2013.01); *C02F 2303/22* (2013.01)

(58) Field of Classification Search
    CPC ......... B63J 4/00; C02F 1/42; C02F 2103/008; C02F 2201/001; C02F 2201/005; C02F 2209/10; C02F 2301/043; C02F 2303/22; C02F 5/00; C02F 9/005; B08B 3/026
    See application file for complete search history.

(56) References Cited

U.S. PATENT DOCUMENTS

| | | | |
|---|---|---|---|
| 4,452,696 A | | 6/1984 | Lopez |
| 4,967,960 A | * | 11/1990 | Futrell .................... B08B 3/026 239/148 |
| 5,160,430 A | * | 11/1992 | Gasser ................... B01D 61/12 134/109 |
| 5,816,499 A | * | 10/1998 | Christiansen ........... B08B 3/026 239/198 |
| 5,830,366 A | | 11/1998 | Husick |
| 6,778,378 B1 | | 8/2004 | Andelman |
| 6,875,363 B2 | | 4/2005 | Yuri et al. |
| 7,416,666 B2 | | 8/2008 | Gordon |
| 7,658,843 B2 | | 2/2010 | Krock et al. |
| 7,776,222 B2 | | 8/2010 | Glessner et al. |
| 8,038,875 B2 | | 10/2011 | Fukuyo et al. |
| 8,282,830 B2 | | 10/2012 | Salyer |
| 9,695,070 B2 | | 7/2017 | Averbeck et al. |

(Continued)

*Primary Examiner* — Terry K Cecil
(74) *Attorney, Agent, or Firm* — Dunlap Bennett & Ludwig, PLLC

(57) ABSTRACT

A marine water treatment dock box system is provided. The marine water treatment dock box system securely houses a water softener, a deionizer, a high-pressure washer and a selective control system for diverting water for cleaning a docked vessel, for onboard use by the vessel, and/or for high-quality potable water production. The above-mentioned components are operatively associated to outlets disposed along the exterior of the dock box body, maintaining the security and protection of the components. The water softener may be fluidly connected to an inlet to the dock box and a three-way valve for selectively controlling the softened water to one of the following: (1) a high-pressure pump for washing a vessel; (2) to the deionizing tanks for dissolving solids for a spot-free rinse; and or (3) to an outlet to fill onboard fresh water tanks.

6 Claims, 2 Drawing Sheets

(56) References Cited

U.S. PATENT DOCUMENTS

| | | |
|---|---|---|
| 2002/0189987 A1 | 12/2002 | Wagner |
| 2004/0065614 A1 | 4/2004 | Gordon et al. |
| 2007/0034561 A1* | 2/2007 | Kearl .................. C02F 1/42 |
| | | 210/287 |
| 2008/0198531 A1 | 8/2008 | Shiue et al. |
| 2009/0266284 A1 | 10/2009 | Carmichael et al. |
| 2011/0139696 A1 | 6/2011 | Fukuyo et al. |
| 2012/0325733 A1* | 12/2012 | Ostrobrod ............ B01D 61/025 |
| | | 210/241 |

* cited by examiner

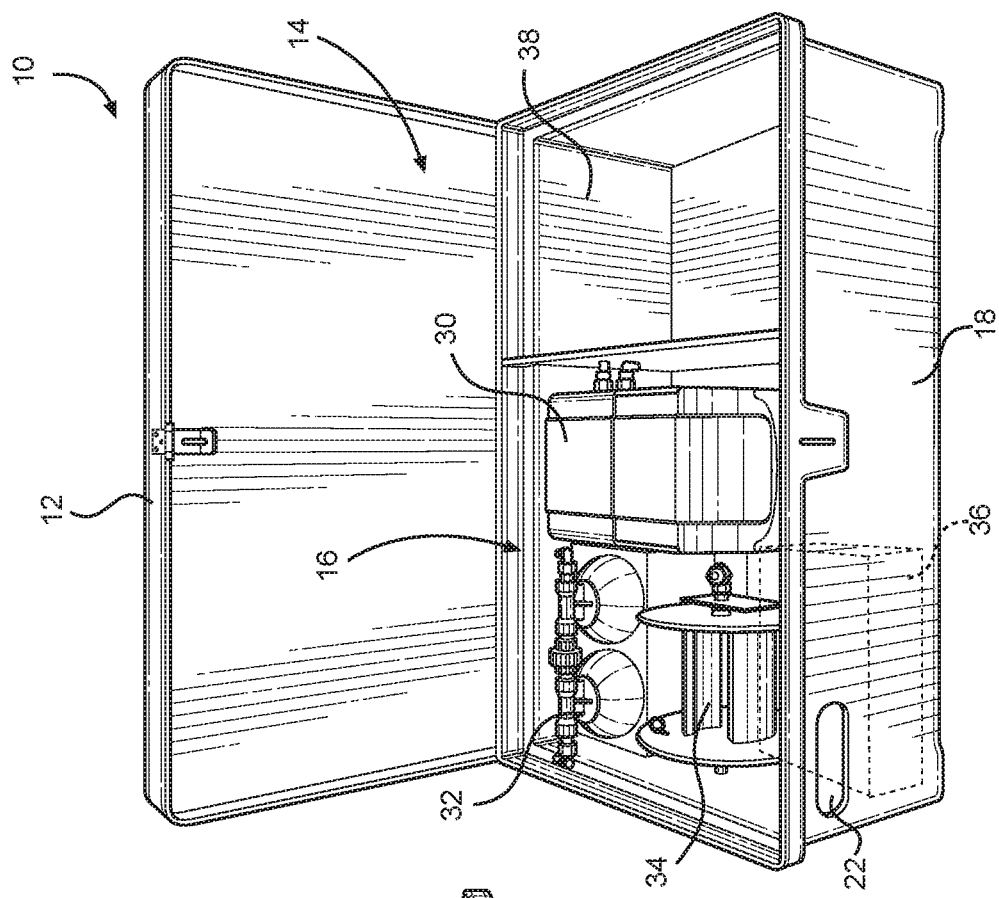
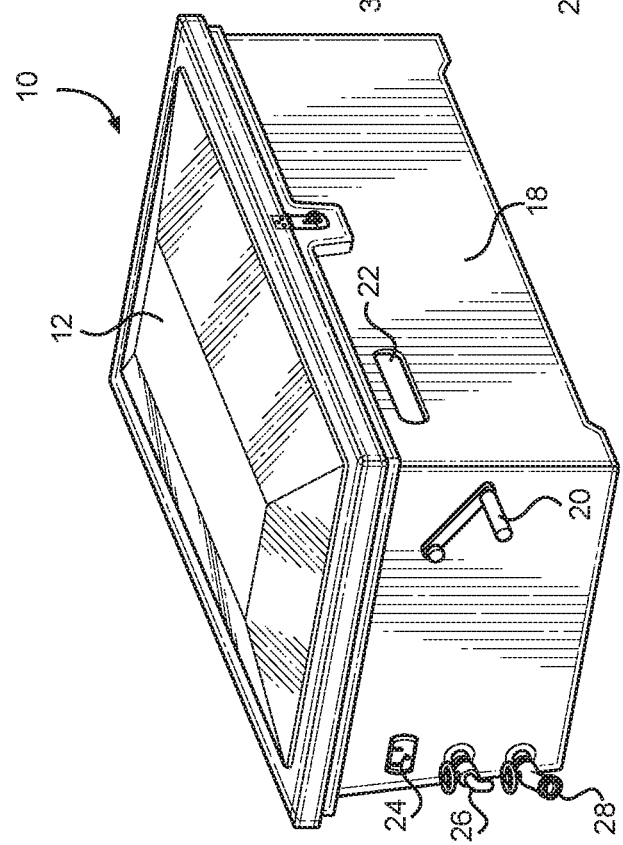
FIG. 2
FIG. 1

MARINE WATER TREATMENT SYSTEM BUILT INTO DOCK BOX FOR HIGH-PRESSURE BOAT WASH AND ONBOARD WATER SUPPLY

BACKGROUND OF THE INVENTION

The present invention relates to dock boxes and, more particularly, to a marine water treatment system built into a dock box for high-pressure boat wash with spot-free rinse, as well as onboard water supply.

Using untreated water to wash boats or yachts wastes soap, money, and time, as hard water does not allow soaps to work efficiently. Additionally, hard water can damage the exterior of boats in the following ways: remove wax and sealers, leave a dull finish, cause soap scum, and require more scrubbing to get surfaces clean, which in turn requires more frequent wax jobs, and so taking more time and product (cost) to wash the boat.

Furthermore, using untreated water for onboard water shortens the life of appliances, pumps, holding tanks, and onboard plumbing. It also wastes soap, shampoo, and other cleaning supplies for the reasons stated above. Additionally, treating marine water requires multiple pieces of equipment, which may not fit on the boat or a pier, may distract from the beauty of a harbor, and may not be protected from theft or nature's elements.

Current dock box systems do not address the onboard water supply challenge at all, and for the initial rinse and wash, they use hard water from the dockside hose, which requires more soap and time scrubbing the boat as mentioned above.

As can be seen, there is a need for a high-pressure boat wash system built into a dock box for housing all components needed for marine water treatment (water softener, deionizer, high-pressure washer, foaming gun, retractable hose, soap products). Some of the components are adapted for onboard use and for use as a high-quality water from potable water source. All of the above-mentioned components are designed to fit in the dock box so that the present invention provides the following advantages: soft water uses 80% less soap, reducing the wear on existing wax, and the cost and time (by 50% through eliminating the need to scrub and dry the vessel) to maintain the boat.

The present invention is embodied in a single attractive dock box that fits on a pier, locks, and is protected from the elements. The dock box wash system includes high-pressure soft water for washing boats, and deionized water for spot-free rinses. The treated water also protects wax, reducing the frequency of waxing a boat. The present invention also supplies soft water for onboard water supply, extending the life of appliances and reducing soap usage.

SUMMARY OF THE INVENTION

In one aspect of the present invention, a marine water treatment dock box system includes the following: an interior space dimensioned to house a water softener, one or more deionizer tanks, and a high-pressure pump; a body defining the interior space and an opening communicating thereto; a water inlet disposed along the body and fluidly coupled to the water softener; and a three-way valve fluidly coupling the water softener to one of the following: the high-pressure pump for washing a vessel; (2) to the one or more deionizing tanks; and (3) to a first water outlet.

In another aspect of the present invention, the marine water treatment dock box system includes the following: an interior space dimensioned to house a water softener, one or more deionizer tanks, a high-pressure pump, and a storage area; one or more partitions separating the water softener, the one or more deionizer tanks, the storage area, and the high-pressure pump; a body defining the interior space and an opening communicating thereto; a water inlet disposed along the body and fluidly coupled to the water softener; a three-way valve fluidly coupling the water softener to one of the following: the high-pressure pump for washing a vessel; (2) to the one or more deionizing tanks fluidly connected to a second water outlet; and (3) to a first water outlet; a high-pressure reel in the interior space, wherein the high-pressure reel is operatively associated with a crank disposed along an exterior surface of said body; and a high-pressure hose void disposed along said exterior surface; and further comprising a high-pressure hose operatively associated with the high-pressure reel and the high-pressure pump so that a distal end of the high-pressure hose is slidable through the high-pressure hose void.

In yet another aspect of the present invention, a method of treating marine water through a dock box including the following: providing the above-mentioned marine water treatment dock box system; coupling a dock water system to said water inlet; and selectively controlling the three-way valve to fluidly couple the water softener to the high-pressure pump for washing a vessel, to the second water outlet via the one or more deionizing tanks for dissolving solids for a spot-free rinse; and to the first water outlet to fill onboard fresh water tanks.

These and other features, aspects and advantages of the present invention will become better understood with reference to the following drawings, description and claims.

BRIEF DESCRIPTION OF THE DRAWINGS

FIG. 1 is a perspective view of an exemplary embodiment of the present invention in a closed position;

FIG. 2 is a perspective view of an interior of an exemplary embodiment of the present invention in an open position;

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Broadly, an embodiment of the present invention provides a marine water treatment dock box housing a water softener, a deionizer, a high-pressure washer and a selective control system for cleaning a docked vessel, providing water for onboard use by the vessel, and/or as a high-quality potable water source. The above-mentioned components are operatively associated to outlets disposed along the exterior of the dock box body, maintaining the security and protection of the components. The water softener may be fluidly connected to an inlet, and a three-way valve for selectively controlling the softened water to one of the following: (1) to a high-pressure pump for washing a vessel; (2) to the deionizing tanks for dissolving solids for a spot-free rinse; and or (3) to an outlet to fill onboard fresh water tanks.

Figure 3:
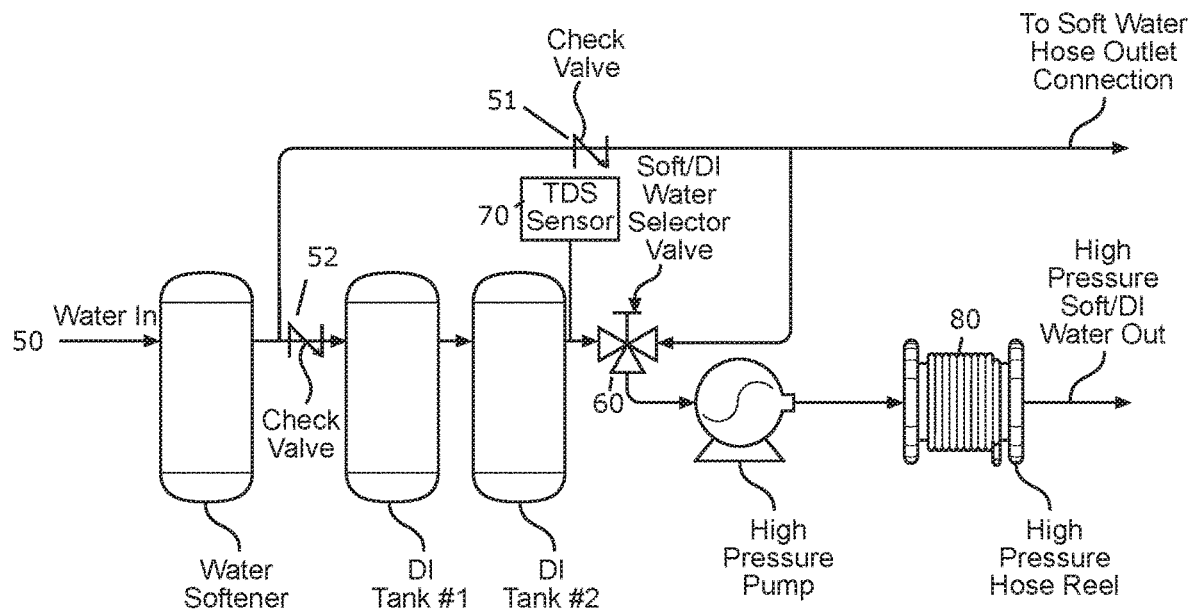
FIG. 3 is a schematic view of an exemplary embodiment of the present invention illustrating the working process of the interior.
Figure 4:
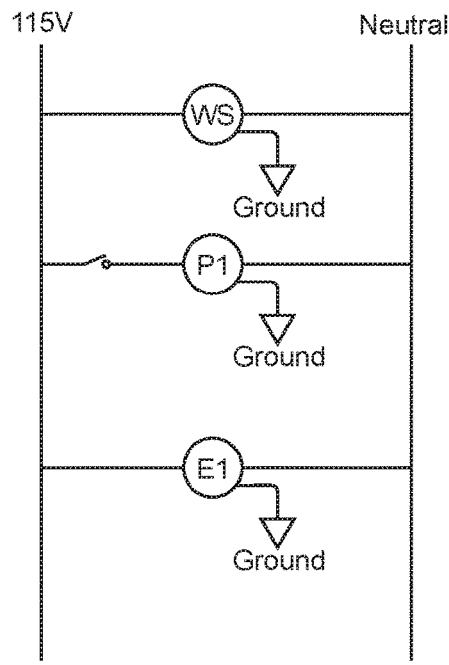
FIG. 4 is a schematic view of an exemplary embodiment of the present invention illustrating an electrical connection with a power source.

Referring to FIGS. 1 through 4, the present invention may include a dock box system 10, which may include a body portion 18 defining an interior space 14 and an opening that communicates to said interior space 14. A lid 12 may be pivotably attached along a periphery of the opening for moving between a closed position (illustrated in FIG. 1) and an open position (illustrated in FIG. 2). The interior space 14 houses the novel arrangement of components 16, including a water softener 30, one or more deionizing tanks 32, a hose reel 34, a high-pressure pump 36, and a storage area 38.

The hose reel 34 may be operatively associated with a hose reel crank 20 disposed along the exterior of the body portion 18.

The high-pressure pump 36 may be fluidly coupled to a high-pressure hose 80 that can be wound about the hose reel 34, while its distal end can be slid through a high-pressure hose exit 22 disposed along the exterior of the body portion 18. The high-pressure pump 36 may be fluidly coupled to a high-pressure gun (not shown), foam cannon (not shown), power washing nozzles (not shown), or the like, which may be stored in the storage area 38. The high-pressure hose 80 would be used for washing/rinsing a vessel.

The water softener 30 may be operatively associated with a water inlet 50 and, by way of a first check valve 51, a soft water outlet 26 disposed along the exterior of the body portion 18. The water softener 30 may be fluidly connected, by way of a second check valve 52, to the one or more deionizing tanks 32; in between such fluid connection may be a TDS meter or sensor 70. The soft water outlet 26 may be used to fill fresh water tanks onboard the vessel.

Each deionizing tank 32 may be fluidly associated with a water hose outlet 28 provided along the exterior of the body portion 18 so that a user may fluidly connect a water hose (not shown) to the water hose outlet 28 for rinsing the vessel after high-pressuring washing. One or more of the deionizing tanks 32 may be fluidly connected, by way of a soft-deionizing water selector valve 60, to the high-pressure pump 36. The soft-deionizing water selector valve 60 may be a three-way valve. The exterior of the body portion 18 may provide an electrical outlet 24 for forming an electrical connection with a power source, so as to power the novel arrangement of components 16, if needed, for example through powering a pressure test plumbing control circuitry, a test-high pressure pump control circuitry, or the like.

The body portion 18 may be a 52"×24"×26" fiberglass dock box body. The interior space 14 may provide one or more divider walls so as to separate the novel arrangement of components 16, such as the water softener 30, the high-pressure pump 36, the one or more deionizing tank 32, the hose reel 34, and the storage area 38, which are properly plumbed.

A method of using the present invention may include the following. The dock box system 10 disclosed above may be provided. A garden hose (not shown) may be connected to the pier water supply and then to the inlet 50 on the dock box system 10. Once water enters the dock box system 10, it may go directly to the fully automatic water softener 30 where minerals are removed from the water. Out of the water softener 30 (and still within the dock box), the now-softened water can take three routes: (1) to the high-pressure pump to wash the boat with soft water; (2) to the deionizing tanks 32, where the total dissolved solids (TDS) are removed from the soft water, producing 0 TDS water for a spot-free rinse; or (3) directly to a separate garden hose outlet, which connects to a boat inlet water to fill onboard fresh water tanks.

A 3-way valve 60 may control water flow that comes out of the water softener 30 to route either to (1) or (2), allowing the user to decide whether to work with soft water or deionized water. For the initial rinse and washing of the boat, a user may set the 3-way valve for soft water; when rinsing the boat, and thereafter set the 3-way valve 60 to deionized water for onboard use.

Once the position is set, the selected type of water may be sent to the built-in high-pressure pump 36. The outlet of the high-pressure pump 36 may be connected to a high-pressure hose reel 34 adapted to coil 100 feet of non-marking high-pressure hose 80. The high-pressure hose 80 exits the dock box through a steel hawse pipe and/or the high-pressure hose exit 22. The high-pressure hose 80 may be connected to a high-pressure gun, using nozzle attachments or foam cannon.

For an initial rinse of the vessel, the user may attach the high-pressure nozzle to the high-pressure hose 80 (with the 3-way valve set at soft water). Then, remove the nozzle, connect the foam cannon and add boat wash, and apply a thick layer of suds to everything to be cleaned.

Operational steps may include one or more of the following: uncrating the dock box system 10 and placing it on a flat level location where the dock box system 10 can be used, adding water softening salt to the water softener brine well, connect garden hose to the water inlet, connect backwash line to backwash fitting on back of dock box, connect power to power inlet port with a 12/3 grounded cord (not supplied), testing water from water source with included test strips, programming water softener as per softener manual, turning water on and checking for leaks, turning power on, opening the dock box body 18 to the open position, turning the pump switch on, selectively moving the 3-way selector valve in a soft water position, unrolling as much hose as needed, install pressure nozzle in hose gun, rinsing surfaces to be cleaned with soft water to remove loose dirt and debris, removing pressure nozzle from gun and install foam cannon, filling foam cannon with boat wash, applying thick layer of foam over all surfaces to be cleaned, letting soak for 5 minutes, removing a foam cannon from gun and reinstalling pressure nozzle, rinsing off all soap foam, for tough stains get close to stain with the pressure nozzle to remove, turning the 3-way selector valve to the deionize position, flushing some water through the high-pressure gun to clear the soft water out of the hose, and once the TDS meter reads below 20 ppm making a final rinse, then reeling in high pressure hose, turning the 3-way selector valve back to soft water for next use, shutting the off pump and closing the dock box. As a result, after washing, everything may be dried to a spot-free finish, no drying required.

Additionally, the system embodied in the present invention can be used at home for cleaning outdoor items like patio furniture, exterior windows, brick, and siding. It also can be used to wash trucks and vehicles. Likewise, the present invention can be used to clean and supply water for campers and RVs. Also, the present invention can produce high-quality water from potable water source for various reasons.

It should be understood, of course, that the foregoing relates to exemplary embodiments of the invention and that modifications may be made without departing from the spirit and scope of the invention as set forth in the following claims.

What is claimed is:

1. A marine water treatment dock box system, comprising:
a body having solid planes defining an interior space and an opening thereto;
a lid attached to the body in such a way as to move between an open position and a closed position covering said opening and enclosing the interior space;
the interior space comprising a water softener, one or more deionizer tanks, a high-pressure pump, and a reel;
a water inlet fluidly coupling an exterior environment to the water softener;
a void in the body, wherein the void is adjacent the lid and the reel and includes an opening configured to allow a hose wound about the reel to slide therethrough, and wherein the void opening has a longitudinal length substantially less than a longitudinal length of the reel; and
a three-way valve selectively fluidly coupling the water softener to the following: (1) the high-pressure pump; (2) to the one or more deionizing tanks; and (3) to a first water outlet.

2. The marine water treatment dock box system of claim 1, further comprising a storage area in the interior space.

3. The marine water treatment dock box system of claim 1, further comprising one or more partitions separating, from each other, the water softener, the one or more deionizer tanks, the high-pressure pump, and the reel.

4. The marine water treatment dock box system of claim 1, further comprising a second water outlet disposed along an exterior surface of the body.

5. A marine water treatment dock box system, comprising:
a body having solid planes defining an interior space and an opening thereto;
a lid attached to the body in such a way as to move between an open position and a closed position covering said opening and enclosing the interior space;
the interior space comprising a water softener, one or more deionizer tanks, a high-pressure pump, a reel, and a storage area;
one or more partitions separating, from each other, the water softener, the one or more deionizer tanks, the high-pressure pump, and the reel;
a water inlet fluidly coupling an exterior environment to the water softener;
a three-way valve selectively fluidly coupling the water softener to each of the following: (1) the high-pressure pump; (2) to a first water outlet; and (3) to the one or more deionizing tanks fluidly connected to a second water outlet;
a crank operatively associated with the reel and disposed along an exterior surface of said body; and
a void in the body, wherein the void is adjacent the lid and the reel and includes an opening configured to allow a hose wound about the reel to slide therethrough, and wherein the void opening has a longitudinal length substantially less than a longitudinal length of the reel,
wherein the first water outlet is disposed adjacent the second water outlet along the exterior surface of the body.

6. A method of treating marine water through a dock box, comprising:
providing the marine water treatment dock box system of claim 5;
coupling the dock box system to said water inlet; and
selectively controlling the three-way valve to fluidly couple the water softener to the high-pressure pump for washing a vessel, to the first water outlet to fill onboard freshwater tanks of the vessel; and to the second water outlet via the one or more deionizing tanks for dissolving solids for a spot-free rinse of the vessel.

* * * * *